United States Patent Office 3,079,309
Patented Feb. 26, 1963

3,079,309
COLORING OF ANODIZED ALUMINUM
Eugene Wainer, Shaker Heights, Ohio, assignor to Horizons Incorporated, Cleveland, Ohio, a corporation of New Jersey
No Drawing. Filed June 20, 1960, Ser. No. 37,042
8 Claims. (Cl. 204—35)

This invention relates to the coloring or decoration of anodized aluminum. More particularly it relates to the use of novel compositions comprising water-compatible inks containing dyestuffs or other color forming substances and the use of such compositions for the decoration of anodized aluminum in a procedure wherein all of the coloring materials are utilized to the fullest extent in the process.

The coloring of anodized aluminum with organic dyes and colored inorganic compounds is already known, being described in Bengston United States Patent No. 1,869,041 and Tosterud United States Patent No. 1,946,148 and in other descriptions. For coloring by organic dyes, a simple procedure involves immersion of the entire anodized surface in a water solution of the dye, maintained at an elevated temperature, until the anodized surface has imbibed as much of the dye as possible. Then the solution is heated to the boiling point and after a few minutes the pores in the anodized surface are sealed with the dyestuff therein, and a permanent, uniformly colored article is the result of such processing.

As described in United States Patent No. 2,022,798, another manner of producing inorganic colors in the pores of the anodized surface is to effect a precipitation in the pores and then to seal the colored precipitate in the pores by boiling the product.

Other techniques for producing like results are known, but in each of these the desired result has been the general coloring of an entire surface and none of the aforementioned procedures has been found suitable for producing surfaces with two or more distinct and different colors.

When multicolor decoration has been required a number of other approaches have been utilized. One such technique has been to apply a temporary mask or resist to the areas which are not to be colored while the unmasked or exposed areas are colored and then to strip off the mask or resist. A second mask or resist is applied after which a second color is applied to the unmasked areas and then the mask is again stripped off. The process is repeated until the application of colors is completed. Other efforts to impart a plurality of colors to anodized aluminum surfaces have included finishes formed by baking organic lacquers containing water-insoluble or oil-base type colors. Another class of materials used involve the drying of gums or resinoid materials. Such procedures suffer from a number of disadvantages including cleaning difficulties, e.g. the cleaning of dried colors from silk screens, but what is more important, only a single color can be applied to any one area, and hence mixing of colors is not feasible. Further, the gums, resins, and/or lacquers themselves tend to physically hold a large portion of the dye and to cause it to be lost from the product.

One object of the present invention is to provide novel water-base ink formulations or water-compatible ink base formulations which may be utilized for multicolor decoration of anodized aluminum and which permit the dye or coloring material contained in such water-compatible formulations to be forced into the pores in the desired areas of the anodized aluminum with substantially 100% efficiency. It is a further object of my invention to eliminate any drying characteristic of ink formulations such as those described above and to permit easy cleaning of the printing surfaces. Another object of my invention is to extend the variety of dyes and coloring materials that may be utilized for the coloring of anodized aluminum. It is a further object of my invention to eliminate block-off characteristics in the printing inks utilized so that a second ink may be laid over a first ink in order to produce colors intermediate between the two spectral ranges of reflection initially utilized, and it is a final object of my invention to make possible the sealing of the several colors within the pores of the aluminum as a result of the novel process utilized for depositing the colors in the pores of the anodized aluminum.

The novel compositions of the present invention comprise combinations of a liquid base and a coloring matter or color progenitor dissolved in this liquid base, a finely divided inert white pigment, with or without the admixture of viscosity control agents. Minor amounts of water are generally added to the base composition and in order to improve solubility characteristics small amounts of alcohols such as methyl alcohol and ethyl alcohol or simple ketones such as acetone may be added in some instances.

The base liquid utilized in the inks of this invention is an organic hydroxy compound exhibiting a boiling point in excess of 100° C. and which is completely soluble in water. Suitable base liquids include glycerol, the glycols, and the glycol ethers and mixtures thereof. Glycols suitable for the purposes of the invention include the simpler glycols such as ethylene glycol, 1,4-butanediol, 2,3-butanediol, the pentanediols, and the like. Water soluble glycol ethers with suitable boiling points include diethylene glycol monobutyl ether, diethylene glycol monoethyl ether, glycol monobutyl ether, glycol monoethyl ether, and the like.

The coloring matter or color progenitor dissolved in this base liquid may be either organic dyes or inorganic compounds which produce a color directly on the anodized layer or provide the possibility of obtaining such a color through double decomposition reactions.

The organic coloring matters used for the present invention are the usual type commonly known in the art for the coloring of anodized aluminum. Such coloring matters are chosen so as to exhibit a relatively high degree of solubility in the liquid vehicles described above. The color substances most commonly used for such purposes are acid types and types which readily form metal complexes. Typical examples of acid types are the dyestuffs Orange II, Direct Sky Blue, and the like. Other dyes in the same category and identified by their Color Index number are Acid Orange 80, Acid Orange 62, Acid Red 212, Direct Yellow 5, Direct Blue 79, Acid Black 29. Dyes which form metal complexes or which mordant with the aluminum hydrate surface contain salicyl groups and similar linkages and are defined by names such as Chrome Fast Orange R, Palatine Bordeaux RN, Color Index No. 27 Mordant Orange, Color Index No. 17 Mordant Brown, Color Index No. 8 Mordant Orange, Color Index No. 33 Mordant Green. All of the water soluble or sparingly soluble organic dyes normally used for the dyeing of anodized layers on aluminum and well known to those skilled in the art are suitable in the compositions of this invention. Commonly used inorganic coloring matters may be used in the compositions of the invention. For instance, a metallo-organic compound may be utilized in the ink composition and driven into the pores as a result of the process hereinafter disclosed. As a result of subsequent water boiling for sealing operation, hydrolysis takes place to yield the desired color. Organic salts of such metals as iron, cobalt, nickel, manganese, chromium, vanadium, copper, and the like are utilized and the known materials which are suitable for such hydrolytic deposition include acetates, oxalates, acetylacetonates, and the like. In a variation of this technique, colors based on metal salts and utilizing double decomposition reactions may also be applied. In this case, a water soluble, hydrolytically stable reactive ingredient is first placed in the pores of the anodized aluminum either by hand brushing, dipping, or silk screen printing. The second reactive component is then added by printing so as to produce a precipitate within the pores of the aluminum which is subsequently sealed in by the usual procedure, e.g. as described in United States Patent No. 2,022,798.

To provide the desired viscosity in the base liquid, a water soluble polyethylene glycol with a molecular weight of from 4000 to 6000 is added to the mixture of base liquid and dye. These polyethylene glycols are generally supplied to the batch as a 25% water solution.

The final constituent of the compositions is a finely divided inert pigment, the presence of which provides proper printing, fulling, and body characteristics to these water-compatible base inks. For purposes of control and convenience, the pigments chosen are white in color though colored pigments may be used if desired. The pigments I have found most useful for the purposes of this invention are titanium dioxide, precipitated barium sulfate, a coprecipitate of barium sulfate and titanium dioxide, and to a lesser extent finely ground siliceous minerals such as quartz, nepheline syenite, feldspar, and the like. It is important that the pigment be so chosen that no chemical reaction takes place at elevated temperature either with the vehicle of the ink or with the coloring matters involved.

The ink compositions described above are produced as follows: Dealing with inks based on organic dyestuffs, the dye of the particular desired color is added to the base liquid in concentrations ranging between 0.5 and 10% by weight. The base liquid is heated at temperatures not exceeding 100° C. until the dye has dissolved or dispersed completely and the liquid is then allowed to cool approximately to room temperature. A 25% water solution of polyethylene glycol having a molecular weight in the range of 4000 to 6000 is then added and stirred in until dispersion and solution is complete. The preferred amount of polyethylene glycol on a solid basis lies between one part of polyethylene glycol to ten parts of polyethylene glycol per 100 parts of base liquid. The dye solution at this stage will vary from a relatively thin liquid to one which is quite viscous depending on the solubility characteristics of the dyestuff originally added. At this stage, the finely divided inert solid pigment is added with vigorous stirring until a consistency suitable for printing is obtained. This is established by achieving a consistency just short of a thick paste in which state the inks can be ground in a muller, an ink mill, or a ball mill but will not flow readily if the container is tilted. When titanium dioxide is used as the inert, solid pigment, the amounts utilized for achieving a proper printing consistency are in the range of 60 parts by weight to 130 parts by weight of titanium dioxide for each 100 volumes of base solution. In the case of precipitated barium sulfate, the range will vary between 70 parts by weight of precipitated barium sulfate to 140 parts by weight for each 100 volumes of base color solution. In general, the amount of inert pigment needed for fulling purposes will vary as a function of its specific gravity. As a final step, the ink is homogenized by passing the mixture through an ink roller mill, grinding in a ball mill or in a muller or similar attrition device.

To utilize these inks for the purposes of preferential coloring of an anodized aluminum surface, a design is printed on the surface with such ink by a usual technique of brushing, silk screen printing, rubber stamp printing, and the like. The ink is first dried at 80° C. until the surface gloss disappears due to the elimination of residual water. This generally requires between five and ten minutes. The resulting product is then heated at a temperature at about 25 to 75° C. below the boiling point of the highest boiling liquid constituent in the composition. In the case of glycerol, such a temperature would be of the order of 225° C. to 250° C. In those cases where the tinctorial power of the dye is destroyed by maintaining it at this high temperature for too long a period, a lower boiling point liquid is used instead of glycerol. At the temperatures indicated, the glycerol and glycerol type liquids are evaporated completely from the surface in approximately five to eight minutes. The deeply colored ink is replaced with an almost white deposit of the original pigment. The white deposit is brushed from the surface with a soft cloth and it is found that practically all of the coloring matter originally available in the ink has been driven into the pores of the aluminum underneath and is not disturbed by the wiping process. The inert pigment residue, while soft, is still strong enough to maintain its position so that the plate may be handled with impunity. After the inorganic pigment residue has been removed by wiping, the second color is printed on and the process is continued until the entire surface is colored as desired. The anodized layer and the multicolor pattern it now contains is then sealed by standard techniques, usually involving immersion in boiling distilled water containing minor amounts of nickel and cobalt acetate.

In the case of dyeing with inorganic salts where a single inorganic salt is utilized as the color agent and subsequently hydrolyzed in the pores as a result of the sealing practice, the procedure as described above is followed in identical fashion.

In the case of dyeing utilizing double decomposition reactions, the areas desired to be colored are first impregnated with a brush or sponge. Usually the agent least susceptible to hydrolysis is added first. This is followed by printing the second agent required for formation of the precipitated color in the pores of the aluminum in which such second agent is made up in the ink form as described previously. In the sealing operation which takes place subsequently, only those areas which have been contacted by the printing ink vehicle itself will develop the color since the water soluble first agent is washed out of the pores without causing any reaction to take place.

Having described my invention in general terms, the following examples are indicative of the practice of my invention and are to be considered as illustrative and not as limitative thereof.

*Example 1*

Four grams of Sandoz aluminum yellow 4A is dissolved in 100 cc. of glycerol at 80° C. After solution is complete, the solution is allowed to cool to room temperature, after which 5 grams of polyethylene glycol of approximate molecular weight 4000 dissolved in 20 cc. of water is added with stirring. Thereafter, 140 grams of pigment grade titanium dioxide is stirred into the solution and the batch then passed through a roller mill to complete the dispersion and insure the elimination of lumps.

A similar red ink is made except that the dyestuff used in this case is Sandoz aluminum red 5B in the amount of 8 grams and the amount of titanium dioxide pigment added is 120 grams.

A similar blue ink is prepared utilizing Sandoz aluminum blue B in the amount of 2½ grams and 135 grams of titanium oxide pigment.

A green ink is prepared by utilizing a mixture of 4 grams of Sandoz aluminum yellow 4A and 0.75 gram of Sandoz aluminum blue B. In this case, the amount of titanium dioxide pigment is 140 grams.

Utilizing the yellow ink first, this is screened on a dry freshly anodized surface through a pattern made available by a silk screen stencil made by standard techeniques. Immediately after screening, the specimen is placed in an oven at approximately 85° C. and held at this temperature for five minutes, after which the specimen is transferred to a second oven maintained at a temperature of approximately 230° C. and held at this temperature, again for five minutes. After removal from the oven, the specimen is allowed to cool and the white crust left on the surface is removed by wiping with a soft cloth, exposing the deeply dyed yellow surface. The process is repeated with each of the colors successively as defined in the foregoing, utilizing the particular screen made for the color in question. After the last of the colors has been laid down and the surface wiped clean with a dry cloth, the panel is immersed in a standard sealing solution at the boiling point, and the boiling continued for fifteen minutes. The sealing solution consisted of nickel acetate, cobalt acetate, and boric acid in distilled water. The concentration of the nickel acetate was approximately 6 grams per liter, the cobalt acetate approximately 1 gram per liter, and the boric acid approximately 8 grams per liter so as to yield a pH between 5 and 6. The overall procedure as given in this example is completed with the sealing operation, yielding a multicolor, color fast product.

*Example 2*

The inks were made up as in Example 1 except that the glycerol was replaced with an equal volume of 1,4-butanediol, and the titanium oxide pigment was replaced with precipitated barium sulfate. Two different inks were prepared, one red and one black. For the red ink, 8 grams of aluminum red A and 150 grams of barium sulfate were used. For the black ink, 12 grams of aluminum black K and 105 grams of barium sulfate were used. The printing, heat treatment, cleaning, and sealing operations were the same as described in Example 1 except that the final baking was carried out at 200° C. instead of 230° C.

*Example 3*

The same colors and concentrations of dyestuffs as described in Example 1 were utilized except that the glycerol of Example 1 was replaced with an equal volume of diethylene glycol monobutyl ether and the titanium dioxide pigment was replaced with a pigment based on the co-precipitation of barium sulfate and titanium dioxide designated in the trade as Titanox B. The procedure as followed in Example 1 was repeated except that the high temperature baking operation was carried out at 180° C. rather than at the 230° C. listed in Example 1.

*Example 4*

Twelve grams of ferric acetate were dissolved in 100 cc. of diethylene glycol monobutyl ether at a temperature of 60° C. After cooling to room temperature, 10 cc. of a 25% solution of polyethylene glycol were added and mixed in thoroughly. One hundred twenty grams of pigment grade titanium dioxide were then added and the ink homogenized on an ink mill. After printing, pre-baking at 80° C., finished baking at 180° C., and wiping off the pigment residue on the surface of the anodized alumina, a deep yellow bronze color was obtained after sealing.

*Example 5*

A mixture of one gram of polyethylene glycol of molecular weight 6000 and 3 grams of thiourea was dissolved in 100 cc. of water and this was used as an impregnating solution for a freshly anodized plate. After impregnation, the plate was wiped clean with a cloth and allowed to dry.

An ink was prepared by dissolving ten grams of silver nitrate in 100 cc. of 1,4-butanediol at room temperature. Twenty cc. of a water solution containing 5 grams of polyethylene glycol were added, followed by the addition of 120 grams of pigment grade titanium dioxide. The mixture was homogenized on a roller mill. The ink was printed through a silk screen as before and given a pre-bake at 80° C. for five minutes, and a final bake for the elimination of carrying fluid at 200° C. for five minutes. After removal of the titanium dioxide crust by wiping and then sealing in the sealing solution indicated above, a black image with somewhat brown overtones was obtained only in those areas contacted by the silver containing printing ink.

*Example 6*

The procedure in accordance with Example 5 was repeated except that 12 grams of cadmium acetate were utilized as a replacement for the silver nitrate. After printing and treatment as described in Example 5, the color obtained was a bright yellow, again only in the areas which are contacted by the printing ink.

*Example 7*

The freshly anodized aluminum was pretreated by immersion in a solution consisting of two grams of sodium sulfate and one gram of polyethylene glycol of molecular weight 6000 per 100 cc. of water. After impregnation, the surface was wiped with a cloth and the specimen allowed to dry. An ink was prepared by dissolving ten grams of lead acetate in 100 cc. of warmed glycerol. After cooling, 10 cc. of a 25% solution of polyethylene glycol were added, followed by the addition of 140 grams of precipitated barium sulfate. The ink was homogenized as before and after printing, pre-baking, final baking, and sealing, a white image with a slightly gray tone was obtained only in the areas contacted by the printing ink.

While I do not wish to be bound by any specific theory as to the manner in which the above described results are obtained, it appears that the first, low-temperature heat treatment opens the pores in the anodized layer and facilitates the absorption of the coloring matter while the second heating, at a somewhat higher temperature, is essential to remove all the vehicle from the pigment, desorb the dye solution from the pigment and thus drive the coloring matter into the pores. The pigment thus fulfills its requirement of permitting the desorption action to take place at high efficiency while the vehicle is being evaporated from the surface.

It will be evident that the two heating steps may be performed by charging the article into an already hot furnace so that the initial heating step occurs during the period when the article is coming to furnace temperature.

Instead of polyethylene glycol, other viscosity control agents may be used provided they are compatible with the remaining constituents in the compositions.

Having now described my invention in accordance with the patent statutes, I claim:

1. The method of coloring anodized aluminum which comprises: applying an ink composition consisting essentially of a water soluble organic hydroxy compound having a boiling point greater than 100° C., a coloring material dissolved therein, a viscosity control agent compatible with and chemically inert toward the remaining constitutents in the composition and a finely divided fulling agent consisting of porous particles of solid inorganic pigment chemically inert toward the remaining constituents in the composition, and wherein the relative proportion of fulling agent in the composition comprises between 60 and 150 parts by weight of fulling agent per 100 parts by volume of the solution of the coloring material in the water soluble hydroxy compound and the concentration of coloring material constitutes between 0.5% and 10% by weight of the water soluble organic hydroxy compound to a porous anodized aluminum surface; heating the resulting article to a temperature at least sufficient to eliminate all liquid from the ink composition, but below that at which the tinctorial power of the coloring material is adversely affected; maintaining the article at said temperature while the coloring material is adsorbed into the porous anodized surface and desorbed from the solid inert pigment, wiping off the remaining solid powdery material, and sealing the resulting colored anodized surface.

2. The method of claim 1 wherein the water soluble hydroxy compound in the ink composition is selected from the group consisting of glycerol, glycols, glycol ethers and mixtures thereof.

3. The method of claim 1 wherein the viscosity control agent in the ink composition is a polyethylene glycol having a molecular weight between 4000 and 6000.

4. The method of claim 1 wherein the water soluble organic hydroxy compound in the ink composition is glycerol, the coloring material is an organic dyestuff and the fulling agent is finely divided titanium dioxide.

5. The method of coloring anodized aluminum which comprises: preparing an ink composition consisting essentially of a water soluble organic hydroxy compound having a boiling point greater than 100° C., and selected from the group consisting of glycerol, glycol, glycol ethers and mixtures thereof; a coloring material dissolved therein; a polyethylene glycol having a molecular weight between 4000 and 6000, as a viscosity control agent; and a finely divided fulling agent consisting of porous particles of solid inorganic pigment chemically inert toward the remaining constituents in the composition, and wherein the relative proportion of fulling agent in the composition comprises between about 60 and 150 parts by weight of fulling agent per 100 parts by volume of the solution of the coloring material in the water soluble hydroxy compound and the concentration of coloring material constitutes between 0.5% and 10% by weight of the water soluble organic hydroxy compound applying the ink composition to a porous anodized aluminum surface; drying the resulting coated article at about 60 to 100° C. for between five and ten minutes; then baking the resulting dried article at a temperature between 25° C. and 75° C. below the boiling point of the highest boiling liquid in the ink composition until any residual liquid has been evaporated from the pores thereof; cooling the baked article; wiping off the powdery solid inert pigment remaining from the coating, while leaving the color adsorbed in the porous surface; and sealing the colored anodized surface by boiling in an aqueous liquid.

6. The method of claim 5 wherein a plurality of differently colored inks are applied to selected areas of said porous surface to produce a multicolor decorated surface.

7. A printing composition consisting essentially of a water soluble organic hydroxy compound having a boiling point greater than 100° C. and selected from the group consisting of glycerol, glycols, glycol ethers and mixtures thereof, a coloring material dissolved therein, a polyethylene glycol having a molecular weight between 4000 and 6000 as a viscosity control agent compatible with and chemically inert toward the remaining constituents in the composition, and a finely divided fulling agent consisting of porous solid inorganic pigment chemically inert toward the remaining constituents in the composition, and wherein the relative proportion of fulling agent in the printing composition comprises between 60 and 150 parts by weight of fulling agent per 100 parts by volume of the solution of the coloring material in the water-soluble organic hydroxy compound and the concentration of coloring material constitutes between 0.5% and 10% by weight of the water soluble organic hydroxy compound.

8. The composition of claim 7 wherein the coloring material comprises an organic dye.

References Cited in the file of this patent

UNITED STATES PATENTS

| | | |
|---|---|---|
| 1,854,363 | Aisen | Apr. 19, 1932 |
| 2,090,511 | Crossley et al. | Aug. 17, 1937 |
| 2,132,620 | Hill et al. | Oct. 11, 1938 |
| 2,254,609 | Kinzer | Sept. 2, 1941 |
| 2,723,205 | Gallup | Nov. 8, 1955 |
| 2,771,372 | Chambers et al. | Nov. 20, 1956 |
| 2,966,419 | Anderson | Dec. 27, 1960 |

OTHER REFERENCES

Vickerstaff: Physical Chemistry of Dyeing, 2nd edition, Interscience Publication, London, 1954, pages 493–494.

Cassidy: Fundamentals of Chromatography, 1957, Interscience Publication, London, pages 239–241.

Man Made Textiles, February 1958, volume 30, No. 405, page 73.

Wernick et al.: "Finishing of Aluminum," Robt. Draper Ltd. Publ., January 1959, pages 351–352 and 368–369.